(12) United States Patent
Goergen et al.

(10) Patent No.: US 8,856,855 B2
(45) Date of Patent: Oct. 7, 2014

(54) SYSTEM AND METHOD FOR TUNING A SET-TOP BOX REMOTELY VIA A SOCIAL NETWORK

(75) Inventors: Michael Goergen, Bend, OR (US); Gary W. Lafreniere, Olathe, KS (US); David Emerson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 412 days.

(21) Appl. No.: 12/625,762

(22) Filed: Nov. 25, 2009

(65) Prior Publication Data

US 2011/0126257 A1    May 26, 2011

(51) Int. Cl.
| | |
|---|---|
| H04N 7/173 | (2011.01) |
| H04N 21/45 | (2011.01) |
| H04N 21/41 | (2011.01) |
| H04N 21/431 | (2011.01) |
| H04N 21/4786 | (2011.01) |
| H04N 21/4788 | (2011.01) |
| H04N 21/6543 | (2011.01) |
| H04N 7/16 | (2011.01) |

(52) U.S. Cl.
CPC ....... *H04N 7/17318* (2013.01); *H04N 21/4532* (2013.01); *H04N 21/4126* (2013.01); *H04N 21/4316* (2013.01); *H04N 21/4786* (2013.01); *H04N 21/4788* (2013.01); *H04N 21/6543* (2013.01)
USPC ............................. 725/132; 725/25; 725/110

(58) Field of Classification Search
None
See application file for complete search history.

(56) References Cited

U.S. PATENT DOCUMENTS

| | | | |
|---|---|---|---|
| 7,788,695 B2* | 8/2010 | Walter et al. ..................... | 725/97 |
| 2003/0009766 A1* | 1/2003 | Marolda ........................ | 725/97 |
| 2004/0194146 A1* | 9/2004 | Bates et al. ................... | 725/110 |
| 2005/0141542 A1* | 6/2005 | Handekyn et al. ............ | 370/437 |
| 2006/0271959 A1* | 11/2006 | Jacoby et al. ................... | 725/46 |
| 2007/0169165 A1 | 7/2007 | Crull et al. | |
| 2008/0098313 A1 | 4/2008 | Pollack | |
| 2008/0111699 A1* | 5/2008 | Kwon et al. .................. | 340/601 |
| 2008/0168491 A1* | 7/2008 | Carlson et al. .................. | 725/33 |
| 2009/0133070 A1* | 5/2009 | Hamano et al. ................. | 725/46 |

OTHER PUBLICATIONS

Hansell, Saul, "Inaugurating Social TV", The New York Times, Jan. 20, 2009 (2 pages).

* cited by examiner

*Primary Examiner* — Chris Parry
(74) *Attorney, Agent, or Firm* — Swanson & Bratschun, L.L.C.

(57) ABSTRACT

A system and method for controlling a set-top box through a social network. Access is granted to control the set-top box to one or more contacts of a user. The one or more contacts being associated with one or more social networks. Access to control the set-top box is granted to one or more contacts of one or more social networks. A request to change media content is received from one of the one or more contacts. The one or more contacts are authenticated to ensure they are authorized to tune the set-top box to the media content. The media content is tuned in for communication to a display in response to authenticating the request from the one of the one or more contacts.

20 Claims, 5 Drawing Sheets

FIG. 5

| User Interface 500 |
|---|

502 Account Number 1234567

Username: testuser

Password: ********

504
Control Permissions for Contacts

[E] Chet Morton     Facebook – chmorton   7-10 p.m.

[T] Red Sox Fan Group     Twitter - @Rdsxfans    ESPN channels only

[C] Shane     MySpace – ss7rules@yahotmail.com

[C] Spousy     Facebook - cleeprk

506
User Preferences

[✓] Request message from the contact as part of the tuning request?

[✓] Authorize tuning if set-top box is activated?

[✓] Require authorization to tune media content?

[✓] Display a notification with the request to change the channell?

[✓] Restrict tuning based on ratings preferences?

[ ] Display viewing history?

[✓] ENABLE ADVANCED OPTIONS

[✓] Allow authorized contacts to power on set-top box and display?

[ ] Require ____ contacts viewing a program to trigger a tuning change to a channel

SYSTEM AND METHOD FOR TUNING A SET-TOP BOX REMOTELY VIA A SOCIAL NETWORK

BACKGROUND OF THE INVENTION

The use of and development of communications has grown nearly exponentially in recent years. The growth is fueled by larger networks with more reliable protocols and better communications hardware available to service providers and consumers. In many cases, social networking websites that encourage individual and group communications and share user posted content are being utilized by increasing numbers of users.

Many communications and entertainment systems are growing together as people expect services that are more intuitive and integrated with their day-to-day life. Some media and communications systems, devices, features, and services have not kept pace as well with the growth experienced by sections of the communications industry.

SUMMARY

One embodiment provides a system and method for controlling a set-top box through a social network. Access may be granted to control the set-top box to one or more contacts of a user. The one or more contacts being associated with one or more social networks. Access to control the set-top box may be granted to one or more contacts of one or more social networks. A request to change media content may be received from one of the one or more contacts. The one or more contacts may be authenticated to ensure they are authorized to tune the set-top box to the media content. The media content may be tuned in for communication to a display in response to authenticating the request from the one of the one or more contacts.

Another embodiment provides a set-top box for receiving tuning request remotely. The set-top box may include a transceiver operable to communicate with one or more social networks. The set-top box may further include control logic in communication with the transceiver. The control logic may be operable to receive a request to tune to media content specified by one or more contacts and authenticate the one or more contacts submitting the request is authorized to tune the set-top box to the media content. The set-top box may further include a tuner in communication with the control logic. The tuner may be operable to tune the se-top box to the media content for communication to a display in communication with the set-top box in response to authenticating the request from the one or more contacts.

Yet another embodiment provides a set-top box for initiating remote tuning. The set-top box may include a processor for executing a set of instructions. The set-top box may further include a memory for storing the set of instructions. The set of instructions may be operable to grant access to control the set-top box to one or more contacts of one or more social networks, receive a request to change media content from one of the one or more contacts, authenticate the one or more contacts is authorized to tune the set-top box to the media content, and tune the media content for communication to a display in response to authenticating the request from one of the one or more contacts.

BRIEF DESCRIPTION OF THE DRAWINGS

Illustrative embodiments of the present invention are described in detail below with reference to the attached drawing figures, which are incorporated by reference herein and wherein:

FIG. 5 is a pictorial representation of a user interface in accordance with an illustrative embodiment.

DETAILED DESCRIPTION

Illustrative embodiments of the present invention provide a system and method for tuning a set-top box remotely through a set-top box. In one embodiment a user of a set-top box may establish permissions that allow one or more contacts, friends, or groups (hereinafter referred to as contacts) to control a tuner of the set-top box to change the content displayed to a display by the set-top box.

The user may set permissions and user preferences that indicate or require that the contacts receive authorization before changing the channel. In various embodiments, authorization may only be required for granting limited or full control to select media content or channels if the user is actively utilizing the set-top box. For example, the authorization may be required through an indicator pop-up window or other user interface element. In one embodiment, the set-top box may interface with one or more social networking sites, portals, pages, applications or other interfaces to receive input from contacts and tune the channel.

This application incorporates by reference utility application Ser. No. 12/499,457, filed on Jul. 8, 2009 entitled SYSTEM AND METHOD FOR A MEDIA CONTENT RECONCILER.

Figure 1:
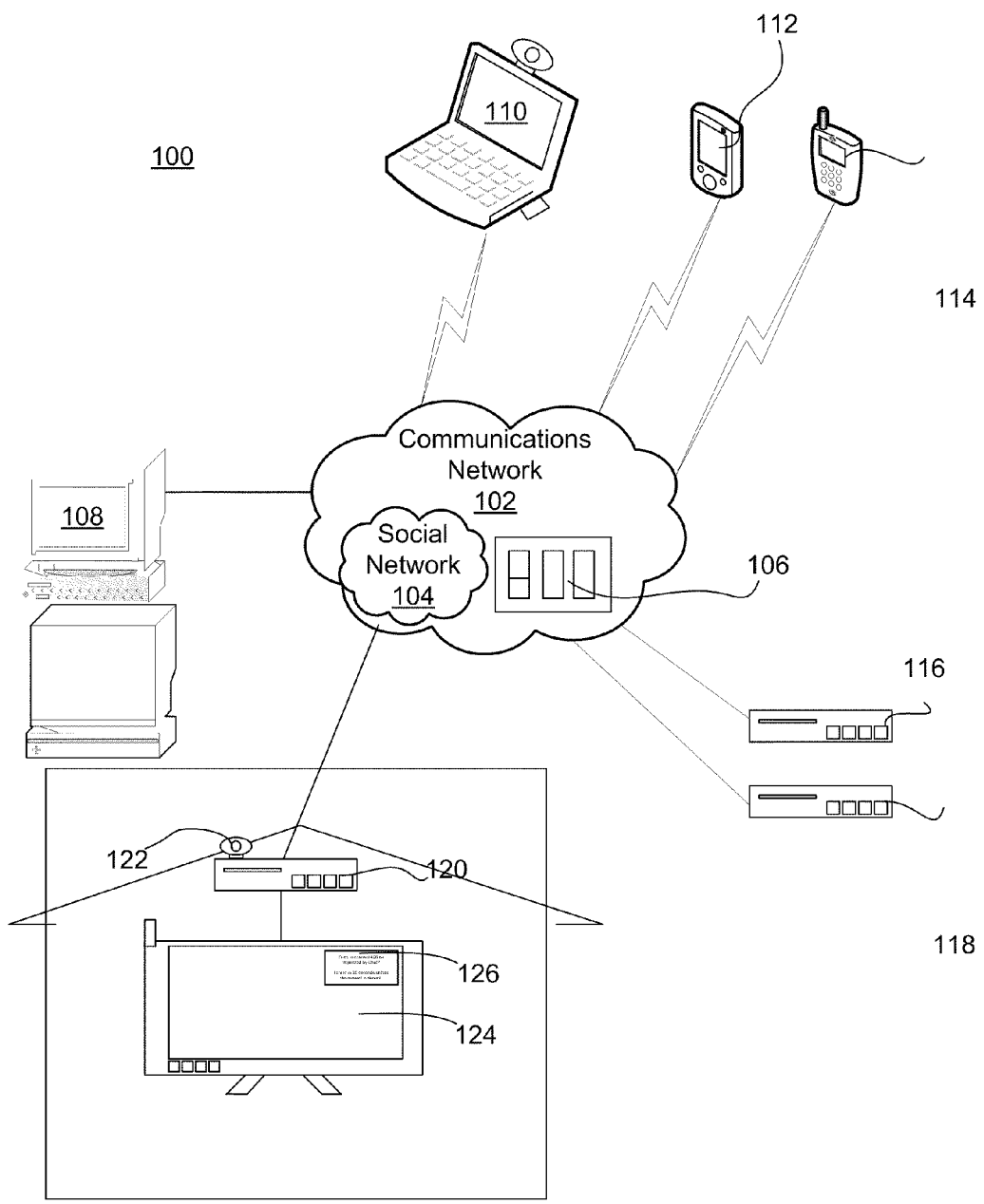
FIG. 1 is a pictorial representation of a communications environment in accordance with an illustrative embodiment.

FIG. 1 is a pictorial representation of a communications environment in accordance with an illustrative embodiment. FIG. 1 shows one possible configuration of a communications environment 100. The communications environment 100 is any number or combination of communications and media systems, equipment, devices, users, providers, networks and other elements that may view, monitor or communicate media content and other communications. The communications environment 100 may include any number of elements, including but not limited to, a communications network 102, a social network 104, a communications management system 106, a client 108, a laptop 110, wireless devices 112 and 114, set-top boxes 116, 118, and 120, a display interface 122, a display 124, and an indicator 126.

Communications within the communications environment 100 may occur on any number of networks which may include wireless networks, data or packet networks, cable networks, satellite networks, private networks, and publicly switched telephone networks (PSTN). The features of the embodiments may be implemented by one or more elements of the communications environments 100 independently or as a networked implementation.

The communications environment 100 may further include any number of hardware and software elements that may not be shown in the example of FIG. 1. For example, the communications environment 100 may further include exchanges, switches, antennas, towers, switching centers, routers, application servers, media servers, service brokers, call agents, edge routers, gateways (signaling, trunking, access, sub, etc.), IP network service providers, adapters, exchanges, switches, users, and networks.

In one embodiment, the communications networks, service providers, and social networks of FIG. 1 may represent distinct or separate entities that provide or perform any number of connections or services for users that are integrated or communicate within the communications environment 100. For example, the communications network 102 may be a nationwide communications service provider providing analog, digital, voice over internet protocol (VoIP), wireless, data, and other communications services and features to millions of users. In another example, communications network 102 may represent a regional provider that represents a much smaller region but similarly provides services to users that communicate with the communications network 102.

The communications management system 106 is one or more devices utilized to enable, initiate, route, and manage media, voice, and data communications between one, or more communications devices. The communications management system 106 may include one or more devices networked to manage the communications networks. For example, the communications management system 106 may include any number of servers, routers, switches, or advanced intelligent network devices. The communications network 102 sends and receives the electronic signals through any number of transmission mediums. The communications network 102 may include various fiber optics, cables, transmission towers, antennas, or other elements for transmitting voice and data communications to the connected telephonic devices.

The set-top box 120 is a conversion device operable to format media content for display by one or more televisions or other similar displays. In particular the set-top box 120 may be a device configured to decode a satellite, cable, fiber optic, Internet protocol, or other signal, and convert and format the signal for display by the display 124, and then communicate the reformatted signal to the display 124 for display to the user. The set-top box 120 may include a digital video recorder (DVR) or personal video recorder (PVR) operable to store media content, applications, past communications, files, data, instructions, information, text, and other data elements for display, retrieval, or implementation as selected by the user.

The display 124 is a visual, audio, and/or tactile output device for communicating the media content to a user. For example, the display 124 may be one or more of a television, radio, Braille pad, computer, monitor, projector, speakers, and other similar media interface devices. The display 124 and the set-top box 120 may communicate through any number of interfaces, cables, or connections wired or wireless.

The set-top boxes 116, 118, and 120 may be connected to or communicate with one or more service providers, networks, connections, other users, and communications systems, equipment and devices. The social network 104 may or may not be integrated with the communications network 102. In one embodiment, the social network 104 is accessible by customers and users of the communications network 102. For example, the communications network 102 may represent the Internet.

The social network 104 is a website or network that focuses on building online or virtual communities of people with a shared interest or activities thereby fostering communication. The social network 104 may include websites such as Facebook, MySpace, Twitter, Digg, Yahoo groups and any number of other social networks that are privately or publicly available. The various devices, systems and equipment of the communications environment 100 may be configured to communicate with the social network 104 and/or the communications management system 106. As a result, tuning of the set-top box 120 may occur based on input, feedback or interactions received from one or more contacts utilizing the client 108, laptop 110, wireless devices 112 and 114 and/or set-top boxes 116 and 118. Similarly, any number of other communications devices may access the social network 104 through a locally installed application, portal, webpage, or other interface.

As previously described, any of the communications devices of the communications environment 100 may include hardware such as digital logic or an application that is configured to interface with the social network 104 in order to perform the various processes and features herein described. For example, the wireless device 112 may have a locally stored application that allows a user to determine the time and date of media content available to the contact as well as the user and then provide input requesting, commanding, or initiating tuning of the set-top box 120 from a first channel or media content to a second channel or alternative media content. In one embodiment, the application executed by the wireless device 112 may require authentication, a password, a hardware or software code (i.e., IP address, phone number, email address, MAC address), or other identifier before sending the command through the communications network 102, social network 104 and/or communications management system 106 to the set-top box 120.

In one embodiment, selections by a contact may be sent directly from a device such as the wireless device 114 to the set-top box 120 with or without passing through the communications network 102. For example, the wireless device 114 may communicate directly with the set-top box 120 through a Bluetooth, WiFi, cellular, data, or voice signal to tune the channel. As a result, the set-top box 120 may include one or more transceivers operable to receive internet protocol (IP), wireless communications, and other forms of communication.

In another embodiment, the contacts may provide input through their respective set-top boxes 116 and 118 in order to tune the set-top box 120 to a specified channel. For example, utilizing a television, remote control, or user interface linked with the set-top box 116, a contact may be able to tune the set-top box 120 to a channel showing breaking news based on the permissions the user of the set-top box 120 has previously granted to the contact or specifically to a number of users of the set-top box 116. The determination of whether a contact is authorized to tune the set-top box 120 may be determined by the set-top box 120 itself or by the social network 104 or communications management system 106. In one embodiment, the content is entirely for entertainment purposes. Alternatively, the content may also be an RSS feed, web broadcast, or other communication from a local government or community service group that provides information regarding critical local happenings, such as tornadoes, floods, and school cancellations.

In one embodiment, the set-top box 120 may be operable to receive tuning requests even in a sleep, hibernation, or standby mode. As a result, in response to receiving a tuning request, the set-top box 120 may power itself on and then tune to the channel selected by the contact. The display interface 122 is a controller for sending control signals to the display 124. In one embodiment, the display interface 122 may be a Bluetooth remote control that commands the display 124 to power on in response to receiving input from one or more contacts to tune to a particular channel. In another embodiment, the display interface 122 may be an infrared remote control that may be utilized to power on the display 124 and other equipment that may be required to view content on the display 124.

For example, the display 124 may also utilize a receiver, sound processing system, or other equipment to be powered on and output media content to the display 124.

The display interface 122 may be configured to communicate with any number, type, and brand of different media devices. The display interface 122 may be automatically programmable or may provide a user interface on the display interface 122 itself or a graphical user interface displayed to the set-top box 120 or display 124 that allows a user to specify the make, model, frequency and any other information that allows the display interface 122 to interact with the media devices which include the display 124. The display interface 122 may also be configured to tune the channel and increase or decrease the volume to a default or specified level. In one embodiment, the tuning request may include information for configuring the display 124, such as volume control, brightness, contrast, and other similar factors. Default settings may also be set by the user or alternately by a contact.

Figure 2:
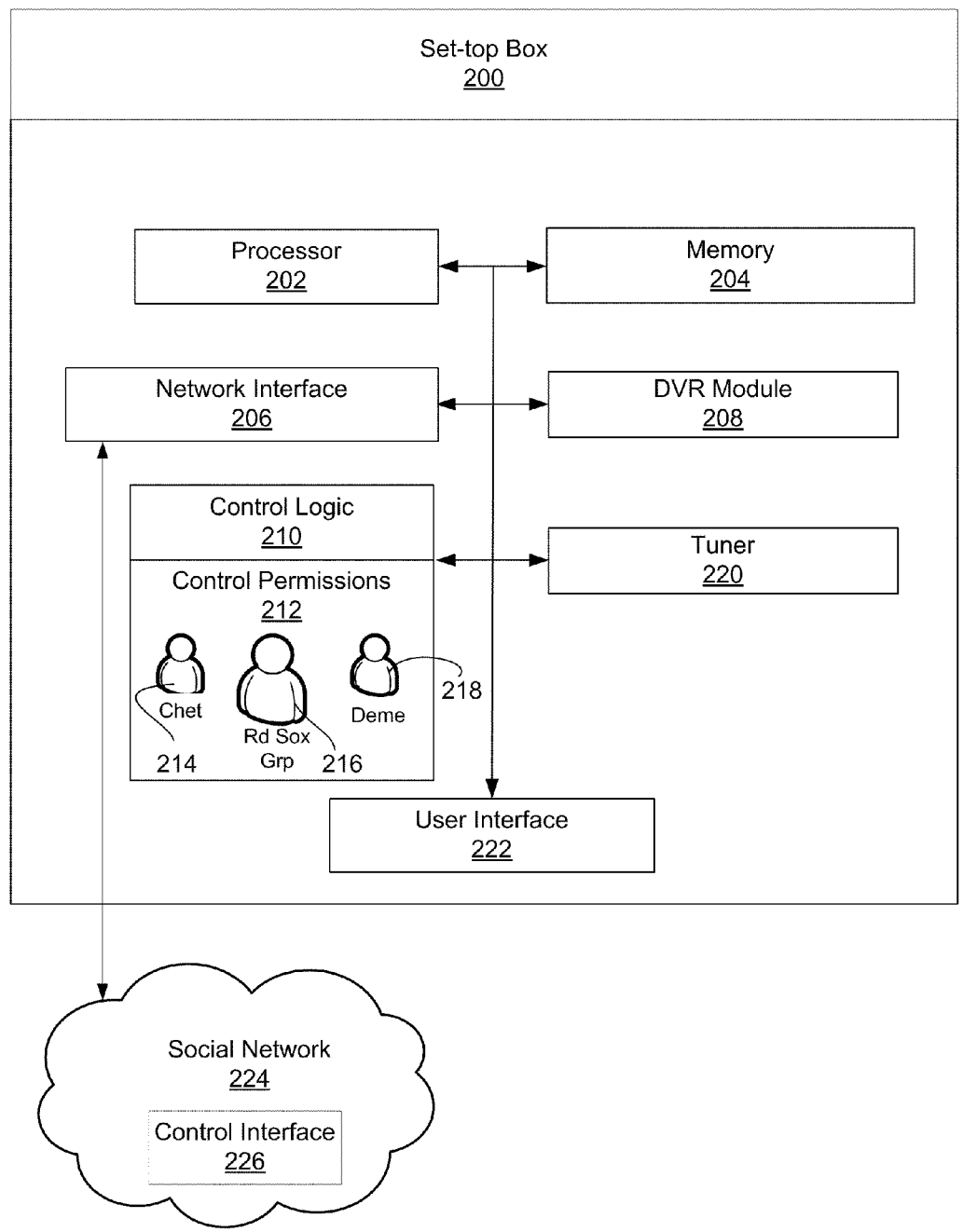
FIG. 2 is a block diagram of a set-top box configured for tuning via a social network in accordance with an illustrative embodiment.

FIG. 2 is a block diagram of a set-top box configured for tuning via a social network in accordance with an illustrative embodiment. FIG. 2 illustrates an embodiment of a set-top box 200. The set-top box 200 is a particular implementation of the set-top box 120 of FIG. 1. The set-top box 200 may include any number of computing and telecommunications components, devices or elements which may include busses, motherboards, circuits, ports, interfaces, cards, converters, adapters, connections, transceivers, displays, antennas, and other similar components. The set-top box 200 may include a processor 202, a memory 204, a network interface 206, DVR module 208, control logic 210, control permissions 212, contacts 214, 216, and 218, tuner 220, and user interface 222. The set-top box 200 may communicate with a social network 224 which may include a control interface 226.

The elements of the set-top box 200 may be implemented entirely in hardware. In another embodiment, the control logic 210 and other elements may be software modules or instructions that are stored in the memory 204 for execution by the processor 202. Alternatively, the set-top box 200 may be a combination of hardware, software and firmware elements that perform the processes, features and other described elements of the illustrative embodiments.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums. In one embodiment, the memory 204 may store the other elements of the set-top box 200.

The network interface 206 is an interface for communicating with a number of communications service providers, networks, users, systems, devices, entities and other parties. The network interface 206 may include any number of ports, communications lines, or other elements. For example, the network interface 206 may include a portal for communicating with each of the communications networks, service providers, users, and contacts to ensure that a dedicated connection is available for adding, updating and storing the media content available in a reconciler database and timing requests with corresponding affirmations or rejections. A portal may be a web site that functions as a central point of access to information on the Internet or an intranet, such as access to media content and communications features of social networks. The portal may be accessed from any computing or communications system or device enabled to communicate through a network connection.

The DVR module 208 includes recording and scheduling elements for processing and recording media content to the set-top box. For example, the DVR module 208 may include a hard disk memory, recording software, visual interface and other similar elements. In one embodiment, the DVR module 208 may record media content in response to an interrupting tuning request to ensure the users viewing of media content is not permanently interrupted.

The control logic 210 is logic that manages the tuner 220 based on the control permissions 212 and user preferences. In one embodiment, the control logic may be digital logic, an application specific integrated circuit (ASIC), field programmable gate array (FPGA), or chipset operable to govern the tuner 220 and/or portions of the set-top box 200.

In one embodiment, the control logic 210 may include an interface for controlling a display connected to the set-top box 200 through wired or wireless connections. For example, the control logic 210 may allow the set-top box 200 and the display to be activated in response to receiving a warning from a contact, such as the director of emergency preparedness for the user's county, locality, or designated area.

The tuner 220 is a selection component for tuning to media content. For example, the tuner 220 may utilize circuitry, such as filters, switches, and logic to tune to specific channel frequencies, bands, IP addresses, Ethernet channels, websites, or other separators for media content.

The user interface 222 is an interface for communicating and receiving information, notifications, indicators, details, and other selections from the user. The user interface 222 may include controls for the set-top box 200 as well as an interface to a remote control or other communications device that may be utilized to control the set-top box 200.

The social network is a particular implementation of the social network 104 of FIG. 1. The social network 224 represents one or more social networking sites utilized by the user. In one embodiment, the control logic 210 may allow the user to log in to the social network 224 through the set-top box. As a result, the set-top box may enable standard social networking communications.

Figure 3:
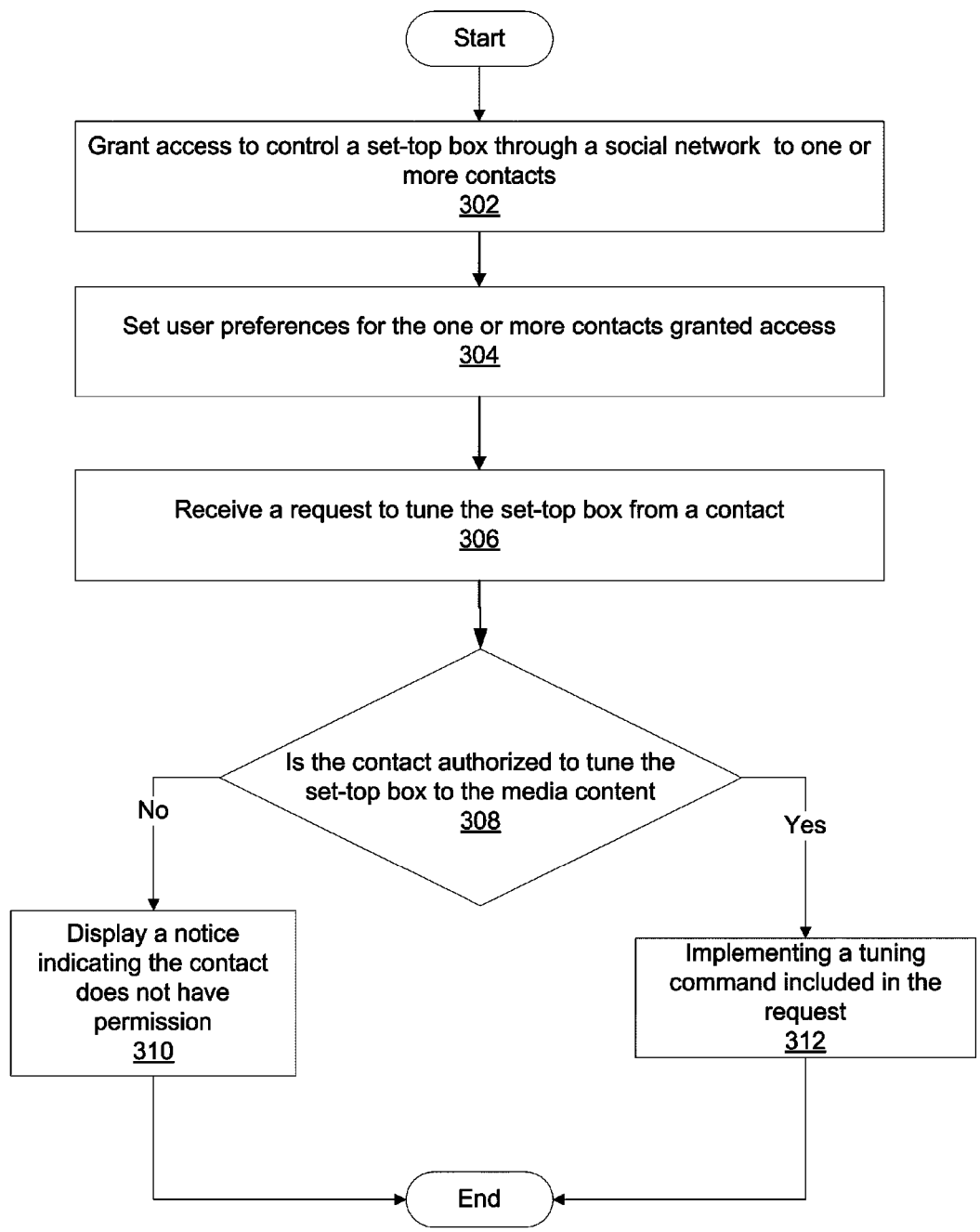
FIG. 3 is a flowchart of a process for tuning a set-top box through a social network in accordance with an illustrative embodiment.
Figure 4:
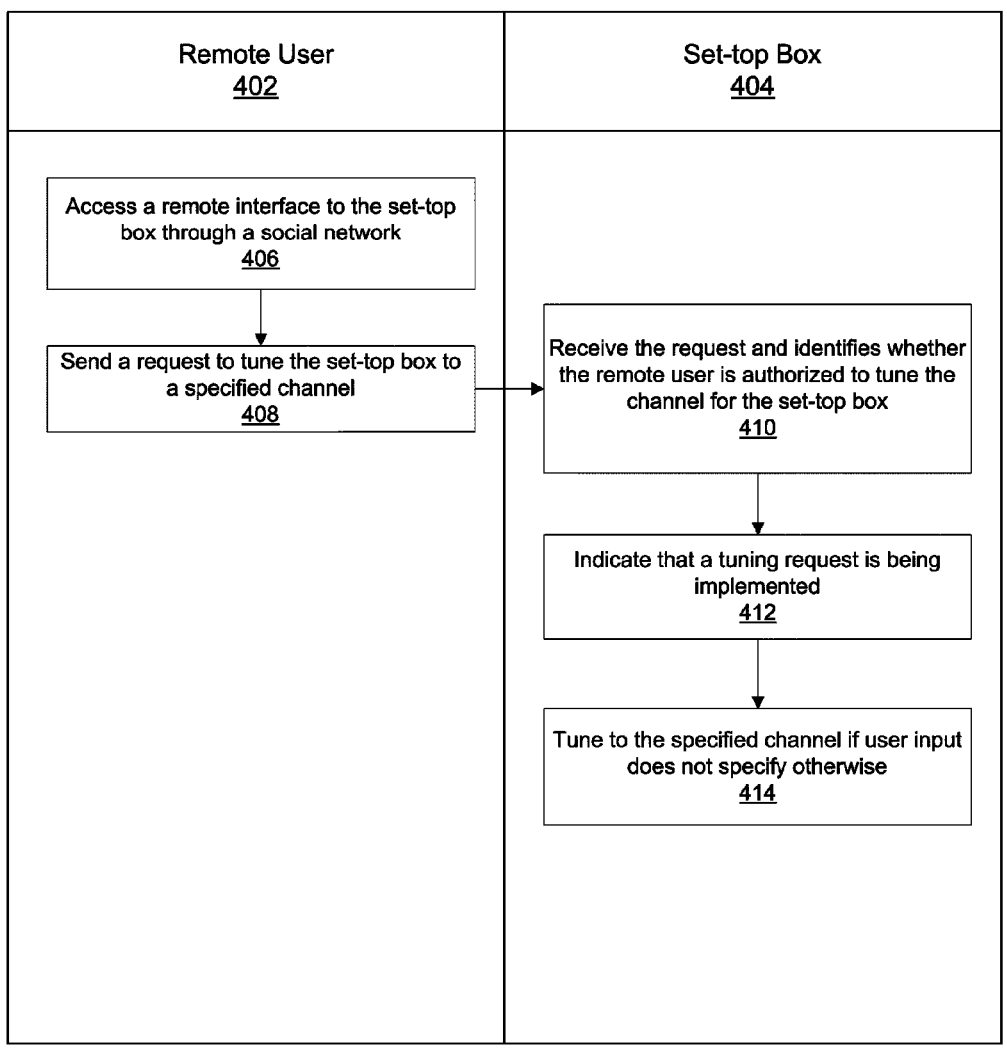
FIG. 4 is a flowchart of a process for tuning a set-top box remotely in accordance with an illustrative embodiment.

FIG. 3 is a flowchart of a process for tuning a set-top box through a social network in accordance with an illustrative embodiment. The process of FIG. 3 may be implemented by a set-top box communicating with a social network. The set-top box may utilize a locally installed social network application, portal, or other direct or indirect interface to the social network. In one embodiment, the process of FIGS. 3 and 4 represent hardware functionality, software, or algorithms that may be implemented or executed to perform tuning of the set-top box.

The process may begin by granting access to control a set-top box through a social network to one or more contacts (step 302). The set-top box may pull or retrieve contacts from a number of social networking sites, collaborations, forums or other communications groups of which the user may be aligned with, have an assigned username or identifier, or otherwise subscribe freely or mandatorily. The set-top box may present a user interface, icons, check boxes, sliders, or other elements for selecting contacts that are authorized to tune the set-top box. The user may be required to enter names, usernames, nicknames, phone numbers, service providers, IP addresses, phone numbers, MAC addresses, or other identifiers that may be utilized to authenticate the contact.

In one embodiment, the user may set authorization levels, for example, some contacts may have all-inclusive access to tune the set-top box at any time. Other users may have time and content limitations. For example, user Fnymonikr may only be granted authorization between 6-10 p.m. and for programs that are rated between G and PG-13 or there approximate equivalent. In one embodiment, the authorization may allow the contact to activate the set-top box and television for the user. For example, if the user is part of an active military unit, a contact from the same unit may be authorized to turn on the set-top box and associated television even in the middle of the night to display important content. Similarly, the contact may have authorization to turn off or disable the set-top box. For example, an administrator of the set-top box may be a parent that may also use a social networking contact to control or tune the set-top box based on the permissions, authorizations, and user preferences stored in and implemented by the set-top box. The previous examples and illustrations may be implemented during step 302 or 304.

Next, the set-top box sets user preferences for the one or more contacts granted access (step 304). The user preferences may allow a user to automatically display or upload the viewing history, trends, user ratings, and other information about the user to a social networking site or directly to one or more contacts. The user preferences may also specify whether a notification, such as a pop-up, message, picture-in-picture, or other elements is to be displayed in response to a user requesting to tune the channel. For example, if the user is actively watching a channel (i.e. has selected a particular channel within the last half an hour) a pop-up request may request permission to tune to a channel specified by the one or more contacts. For example, the pop-up request may specify information, data or details, such as how long the contact has been watching the media content, title, rating, time remaining, name of the contact extending the request, message associated with the request, and other similar information.

Next, the set-top box receives a request to tune the set-to box from a contact (step 306). As previously discussed, in response to the permissions and user preferences, a notification request, invitation, or message may be displayed to the user.

The set-top box determines whether the contact is authorized to tune the set-top box to the media content (step 308). The media content as herein defined is channels, programs, video clips, pod casts, audio clips, presentations, movies, channels, games, music, stations, Internet or radio feeds, or other media, informational content that may be communicated to a user for display or output through a display. The determination of step 308 may be performed by authenticating that the contact is indeed who he or she says she is and verifying the contact is listed in the permissions. For example, a user name and IP address may be verified with a database of local or remote content information.

Similarly, the set-top box may also verify that the media content or channel that the set-top box is tuning to, downloading, or otherwise preparing to output to the display is allowed by the permissions and user preferences. For example, the user may restrict content that is considered adult content (i.e. rated R, NC-17, X, TV-MA). In one embodiment, the request from the contact may be translated or formatted between the contact and the user. For example, the two or more parties may utilize different communications service providers and as a result the appropriate channel or time may need to be translated or otherwise determined. The contact may be able to delay or pre-program the request to correspond to similar timing across different time zones, such as the beginning of a sitcom comedy that begins at 8:00 p.m. on channel 21 at the contact's location and at 9:00 p.m. on channel 0003 at the users location. One or more set-top boxes or applications may communicate with a content reconciler to translate the requested media content available to the contact to media content displayable by the user (i.e. specific channel, web page, video clip).

In response to determining the set-top box is not authorized to tune to the media content, the set-top box displays a notice indicating the contact does not have permission (step 310). During step 310, the set-top box may also send a message to the contact indicating the request, command, or initiated tuning has been denied. For example, the denial message may prompt a follow-up call, message, or communication clarifying why the contact is sending the request. The set-top box may implement all of the chat, messaging, and calling features of the second network in addition to other communications services available through the set-top box.

In response to determining the set-top box is authorized to tune the set-top box to the media content in step 310, the set-top box implements a tuning command included in the request (step 312). In one embodiment, the authorization and request may be transparent to the user. For example, the set-top box may automatically change to a sport channel showing the previous days highlights for a baseball game that the user and contact went to together. The illustrative embodiments enhance the various features of social networking sites by enhancing the integration of media content, systems, and devices thus further promoting open communications.

FIG. 4 is a flowchart of a process for tuning a set-top box remotely in accordance with an illustrative embodiment. The process of FIG. 4 may be implemented by a remote contact 402 and a set-top box 404. The remote contact 402 may represent a contact of a user of the set-top box. The remote contact 402 may utilize any number of communications devices and networks to communicate with the set-top box 404, such as a cellular phones, personal digital assistants, laptops, personal computers, set-top boxes, web terminals, and communications enabled components.

The process of FIG. 4 may begin with the remote contact 402 accessing a remote interface to the set-top box through a social network (step 406). The remote interface may allow the remote contact 404 to directly or indirectly access the set-top box 404 through a social network or social network application. The remote interface may also be a page or portion of a social networking site dedicated for user by the remote contact 402, such as a home page. Alternatively, the remote interface may be a direct contact between set-top boxes, a link established through a communications service provider, or other communications interface.

Next, the remote contact 402 sends a request to tune the set-top box 404 to a specified channel (step 408). The request may be focused narrowly to a particular channel or more broadly to other media content. Based on the relationship between the user and the remote contact 402, the request may be a request requiring authorization or a command that is implemented without feedback from the user or set-top box 404.

Next, the set-top box 404 receives the request and identifies whether the remote user is authorized to tune the channel for the set-top box (step 410). The request may travel through the social network or through one or more a separate communications network as a discreet message or as an ongoing streaming communication. For example, the request may be a text, email, chat, or other message type. The authentication may be performed based on a supplied user name, password, or other identifier. In one embodiment, the communication between the remote contact 402 and the set-top box 404 may occur through a secure connection. The secure connection may be a virtual private network tunnel, an encrypted connection, firewall, or other form of secured communications link. The determination of step 410 may also be performed based on permissions which may include criteria, rules, and other limitations regarding time of day, user operating the set-top box, rating, program being viewed by the user, and other similar settings.

Next, the set-top box 404 indicates that the tuning request is being implemented (step 412). The set-top box 404 may flash an indicator or message indicating before, during, or after the change indicating the details of the remote tuning. For example, the indicator may specify the user name and name of the remote contact 402, the new content, and a message that may have been sent from the remote contact 402 as part of the tuning request. The user preferences may additionally specify other details and information that are communicated to a user of the set-top box 404 before, during, or after any tuning requests.

Next, the set-top box 404 tunes to the specified channel if user input does not specify otherwise (step 414). In one embodiment, the set-top box 404 may utilize a timer or fading feature that indicates that a change to new media content is going to occur unless cancelled or rescinded by the user. For example, the user may deny the tuning request during the prompt of step 412 or otherwise change the channel preventing the tuning request from being implemented. The user may also lock the set-top box from implementing requests based on contacts, time of day, media content, priority, user utilizing the set-top box and other functions as previously described.

FIG. 5 is a pictorial representation of a user interface 500 in accordance with an illustrative embodiment. The user interface 500 may be implemented as a web page, dedicated channel, application, hardware of a set-top box, or wireless application. The user interface 500 may include section 502, permissions 504, and user preferences 506.

The permissions establish the contacts that are allowed to tune the user's set-top box. As shown the contacts may include individuals and collections of individuals. In some cases, the contacts may include automated users, such as RSS feeds, wire events, and other contacts to which the user subscribes. For example, a level 5 critical alert news alert from CNN's feed may automatically tune the set-top box. The contacts may also have additional limitations. For example, Chet may only be allowed to send tuning request between 7:00 p.m. and 10:00 p.m. Similarly, the Red Sox Fan Group may only be allowed to send requests that involve tuning to ESPN channels or media content. This restriction may be useful as the user may not specifically know each contact in the group. The user may further restrict the rating of the content and the number of requests that may be received for media content within a time period. Acceptable content may be content that is determined to be acceptable for viewing based on pre-configured selections and historical viewing or selections. For example, only two requests may be acknowledged from the Red Sox Fan Group for implementation or denial. The user may also set a status on the set-top box, such as available, do-not-interrupt, or emergency communications only that may control whether remote tuning may be performed.

The user preferences 506 may set additional information managing tuning of the set-top box. The user preferences may govern the way the contacts are authenticated as well as prompts and indicators displayed to the set-top box receiving the request. In addition, the user preferences 506 may include customer configured parameters.

The user interface 500 may alternatively be utilized by the user or contacts to initiate a request to tune a remote set-top box. In one embodiment, the user interface 500 may be integrated with an application that may be used to set the permissions 504, user preferences 506 and send and receive tuning requests. In one embodiment, the user interface 500 is integrated with a social networking site or social networking application to both send and receiving tunings requests.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method for controlling a set-top box through a social network, the method comprising:
    granting access to control the set-top box in real-time to one or more contacts of a user based on user preferences pre-established by the user, wherein the one or more contacts are associated with one or more social networks, and wherein the one or more social networks are externally accessed from the set-top box;
    receiving a request in real-time to change media content from one of the one or more contacts;
    automatically authenticating the one or more contacts are authorized to tune the set-top box to the media content in real-time utilizing the user preferences, wherein the user preferences indicates whether the one or more contacts of the user are able to upload viewing history of the user to the one or more social networks;
    automatically tuning the media content in real-time for communication to a display in response to (1) authenticating the one or more contacts are authorized to tune the set-top box to the media content in real-time utilizing the user preferences, and (2) not receiving user input from the user in real-time denying the request to tune the set-top box within a time period.

2. The method according to claim 1, wherein the receiving further comprises:
    determining the one of the one or more contacts are authorized to tune the media content based on permissions in the user preferences.

3. The method according to claim 2, wherein the permissions establish acceptable content, times, and limitations allowed for the request for each of the one or more contacts.

4. The method according to claim 1, wherein the media content is a channel.

5. The method according to claim 1, further comprising:
    powering on the set-top box in response to receiving the request in real-time.

6. The method according to claim 5, further comprising:
    powering on the display through a display interface of the set-top box in communication with the display in response to receiving the request in real-time.

7. The method according to claim 6, wherein the display interface is a Bluetooth remote control, infrared controller, or wired connection.

8. The method according to claim 1, further comprising:
presenting an indicator allowing the user to accept or deny the request to tune the media content in response to receiving the request in real-time.

9. The method according to claim 8, wherein the indicator specifies the media content.

10. The method according to claim 8, wherein the indicator is a picture-in-picture of the media content.

11. The method according to claim 1, wherein an indicator of the request is displayed to the user.

12. The method according to claim 1, wherein the automatically tuning is restricted utilizing rating preferences.

13. A set-top box for receiving tuning request remotely comprising:
a transceiver operable to communicate with one or more social networks;
control logic in communication with the transceiver, the control logic being operable to receive a request in real-time to tune to media content specified by one or more contacts of one or more social networks, and automatically authenticate the one or more contacts submitting the request in real-time are authorized to tune the set-top box to the media content utilizing user preferences, wherein the user preferences indicates whether the one or more contacts of the user are able to upload viewing history of the user to the one or more social networks, and wherein the one or more social networks are externally accessed from the set-top box; and
a tuner in communication with the control logic, the tuner being operable to automatically tune the set-top box to the media content for communication to a display in communication with the set-top box in response to (1) automatically authenticating the request the one or more contacts are authorized to tune the set-top box to the media content in real-time utilizing the user preferences, and (2) not receiving user input from the user in real-time denying the request to tune the set-top box within a time period.

14. The set-top box according to claim 13, further comprising:
a user interface in communication with the control logic for communicating with a user through the display, wherein the user interface is operable to display the request as an invitation, and wherein the tuner tunes to the media content in response to receiving an acceptance from the user of the invitation.

15. The set-top box according to claim 14, wherein the user interface is operable to store permissions of the user preferences in the control logic granting access to control the set-top box to the one or more contacts of the one or more social networks, wherein the permissions establish acceptable content, times, and limitations allowed for the request for each of the one or more contacts, and wherein the media content is a channel.

16. The set-top box according to claim 13, further comprising:
a display interface in communication with the control logic, the display interface being operable to power on the display, the control logic being further operable to power on the set-top box in response to receiving the request.

17. The set-top box according to claim 13, wherein the one or more contacts are one or more news group feeds, and wherein the media content specifies a channel and a volume level.

18. A set-top box for initiating remote tuning comprising:
a processor for executing a set of instructions; and
a memory for storing the set of instructions, wherein the set of instructions are operable to grant access to control the set-top box in real-time to one or more contacts of one or more social networks utilizing user preferences pre-established by the user, receive a request in real-time to change media content from one of the one or more contacts, automatically authenticate the one or more contacts are authorized to tune the set-top box to the media content in real-time utilizing the user preferences, and automatically tune the media content in real-time for communication to a display in response to (1) authenticating the one or more contacts are authorized to tune the set-top box to the media content in real-time utilizing the user preferences, wherein the user preferences indicates whether the one or more contacts of the user are able to upload viewing history of the user to the one or more social networks, and (2) not receiving user input from the user in real-time denying the request to tune the set-top box within a time period, wherein the one or more social networks are externally accessed from the set-top box.

19. The set-top box according to claim 18, wherein the set of instructions are further operable to:
initiate a user request to tune a secondary set-top box selected media content, wherein the user request is generated utilizing a user interface of the set-top box.

20. The set-top box according to claim 18, wherein one of the one or more contacts is a news feed for urgent information, and wherein the set of instructions is operable to turn on the set-top box and the display in order to display the media content.

* * * * *